Patented Dec. 25, 1951

2,579,494

UNITED STATES PATENT OFFICE 2,579,494

N-(2-THENOYLMETHYL)HEXAMETHYLENE-TETRAMINIUM HALIDES

Edward C. Hermann, Wilmington, Del., assignor to E. I. du Pont de Nemours and Company, Wilmington, Del., a corporation of Delaware No Drawing. Application August 2, 1950, Serial No. 177,335

4 Claims. (Cl. 260—248.5)

This application is a continuation-in-part of my copending application Serial No. 172,393, filed July 6, 1950, now abandoned, of which Serial No. 243,361 filed August 23, 1951 is a continuation-in-part, and the invention relates to new chemical compounds and to chemical methods useful for their synthesis. More particularly, the invention relates to certain N-(2-thenoylmethyl)hexamethylenetetraminium halides having the general formula.

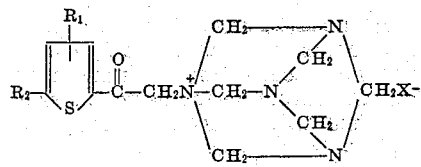

where $R_1$ represents hydrogen or a lower alkyl radical, $R_2$ is hydrogen, halogen, nitro, or lower alkyl radical, and X is either chlorine or bromine.

The compounds can be prepared by several methods. For example, a thiophene compound of the formula

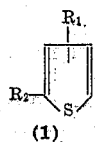

where $R_1$ and $R_2$ have the values already given under the general formula may be acetylated and subsequently halogenated to yield a compound of the formula

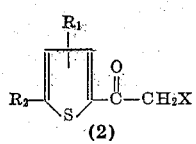

The compounds represented by Formula 2 can then be reacted with hexamethylenetetramine in a solvent such as, for example, chloroform, chlorobenzene, or 1,1,2,2-tetrachloroethane, to produce the novel compounds represented by the general formula shown above.

Alternatively, a compound, such as described by Formula 1, can be reacted with a haloacetyl halide, preferably bromoacetyl bromide, in the presence of aluminum chloride and a solvent such as, for example, carbon tetrachloride, to give a compound represented by Formula 2. The final step of this method is, of course, identical with the third step of previously described synthesis.

Diagrammatically these methods may be represented as follows:

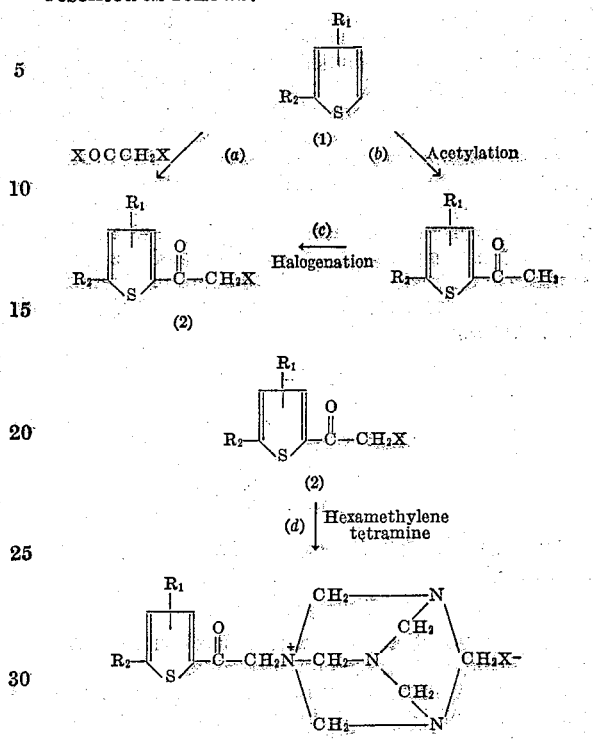

where $R_1$, $R_2$, and X have the values previously given under the general formula.

The choice of one of the above methods depends on a number of factors but primarily upon the nature of substituent(s) on the thiophene nucleus. The shorter method involving steps (a) and (d) is particularly preferred where $R_1$ and/or $R_2$ are alkyl.

These new compounds are useful in the preparation of organic compounds such as, for example, the thienyl amido-1,3-propanediols claimed in my copending application, Serial No. 172,393, filed July 6, 1950. The compounds of the present invention also find use as bacteriostatic agents.

The invention is illustrated by the following examples:

Example 1

Preparation of N-(2-thenoylmethyl)hexamethylenetetraminium bromide.

To a solution of 505 g. of 2-acetylthiophene in 800 ml. of glacial acetic acid irradiated with ultraviolet light is added 640 g. of bromine over a period of about two hours. The temperature of the reaction mixture is maintained at 15-20° C. with an ice bath throughout the reaction period. The reaction mixture is stirred for an additional period of about two hours. The mixture is then poured into 2 liters of cold water. The resulting oil is separated, and the aqueous layer is extracted twice with 400 ml. portions of chloroform. The combined oil and chloroform extracts are washed until neutral with aqueous saturated sodium bicarbonate solution, then with water and finally dried over anhydrous sodium sulfate. The drying agent is then collected and washed with two 100 ml. portions of chloroform. The washings are combined with the original filtrate.

The chloroform solution obtained as described above is added as a single batch to a vigorously stirred mixture consisting of 585 g. of hexamethylenetetramine and 1.5 liters of chloroform. The temperature of the resulting mixture rises rapidly to about 60° C. and is maintained at that temperature by external heating for a period of about four hours with continued stirring. The reaction mixture is then cooled and the solid product which has separated is collected, stirred briefly with 1 liter of absolute alcohol, filtered, washed with 400 ml. of absolute alcohol and then with 400 ml. of ether, and finally air-dried. The crude N-(2-thenoylmethyl)hexamethylenetetraminium bromide may be purified by treating an aqueous solution of same with decolorizing charcoal, filtering, and adding dioxane until a crystalline precipitate is formed. The purified compound which melts with decomposition at about 160° C. has the formula,

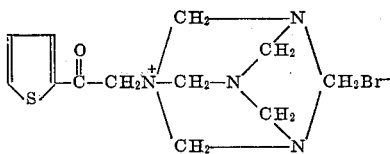

Analysis calculated for $C_{12}H_{17}BrN_4OS$: N, 16.23. Found: N, 16.26.

*Example 2*

Preparation of N-(5-bromo-2-thenoylmethyl)-hexamethylenetetraminium bromide.

5-bromo-2-acetylthiophene is prepared by the acetylation of 2-bromothiophene using acetic anhydride and 85% orthophosphoric acid according to the method of Hartough and Conley (J. Am. Chem. Soc. 69, 3096 (1947)).

A solution of 820 g. of 5-bromo-2-acetylthiophene in one liter of glacial acetic acid is irradiated with ultraviolet light and 640 g. of bromine is added with stirring over a period of about two hours. The reaction mixture is maintained at a temperature of about 15-20° C. by cooling with an ice bath. Stirring is continued for a period of about two hours after the addition of the bromine. The reaction mixture is then poured into about 2 liters of ice water. A product is collected and the aqueous layer is extracted with chloroform. The product and chloroform extracts are combined, washed until neutral with aqueous saturated sodium bicarbonate solution, then with water and dried.

The chloroform solution thus obtained is added to a vigorously stirred mixture consisting of 585 g. of hexamethylenetetramine and 2 liters of chloroform. The temperature of the resulting mixture rises rapidly and the reaction is moderated using an ice bath. After the initial exothermic reaction has subsided, the temperature of the mixture is maintained at about 60° C. for about four hours while the reaction mixture is stirred. The mixture is cooled and the solid which has separated is collected, washed successively with absolute ethanol and ether, and dried. The product consisting of N-(5-bromo-2-thenoylmethyl)hexamethylenetetraminium bromide has the formula

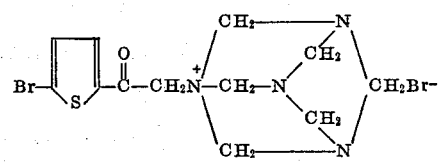

*Example 3*

Preparation of N-(5-methyl-2-thenoylmethyl)hexamethylenetetraminium bromide.

To a suspension of 623 g. of anhydrous aluminum chloride in 2670 ml. of carbon tetrachloride is added 942 g. of bromoacetyl bromide over a period of about one-half hour. The suspension is stirred and maintained at a temperature of about 0° C. throughout the addition. 392 g. of 2-methylthiophene is then added to the resulting mixture over a period of about four hours. During this addition the temperature is kept below 5° C. After the addition is complete, the reaction mixture is stirred for an additional hour. The reaction mixture is then hydrolyzed by pouring into a stirred mixture consisting of ice and hydrochloric acid. The carbon tetrachloride layer is separated, washed with aqueous sodium carbonate solution, and dried. The carbon tetrachloride is removed by distillation under reduced pressure, leaving a residue consisting mainly of 5-methyl-2-bromoacetylthiophene.

To this crude product dissolved in 1200 ml. of chloroform is added a mixture consisting of 585 g. of hexamethylenetetramine and 1.5 liters of chloroform with vigorous stirring. The temperature of the resulting mixture rises rapidly and the reaction is moderated by external cooling. After the initial exothermic reaction has subsided, the temperature is maintained at a temperature of about 60° C. for a period of about four hours. The reaction mixture is stirred continuously during the four hour period, and is then cooled. The solid product, which has separated, is collected, washed with 400 ml. of absolute ethanol and with 400 ml. of ether and finally dried under reduced pressure. The principal ingredient of the crude product having the formula shown below is N-(5-methyl-2-thenoylmethyl)-hexamethylenetetraminium bromide.

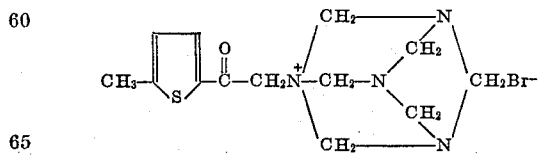

*Example 4*

Preparation of N-(3-methyl-2-thenoylmethyl)-hexamethylenetetraminium bromide.

942 g. of bromoacetyl bromide is added to a suspension of 623 g. of anhydrous aluminum chloride in 2670 ml. of carbon tetrachloride and cooled to a temperature of about 0° C. for a period of about one-half hour. To the resulting mixture is added 392 g. of 3-methylthiophene over a period of about four hours. During this addition the temperature is maintained below 5° C. The reaction is stirred for an additional hour prior to hydrolysis. The reaction mixture is then hydrolyzed by pouring it into a stirred mixture of ice and hydrochloric acid. The carbon tetrachloride layer is separated, washed with sodium carbonate solution, then with water, and dried using anhydrous sodium sulfate. The carbon tetrachloride is removed by distillation under reduced pressure, leaving a residue consisting mainly of 3-methyl-2-bromoacetylthiophene, although some 4-methyl-2-bromoacetylthiophene is also formed in the reaction.

The crude product is then dissolved in 1200 ml. of chloroform and the resulting chloroform solution is added in one portion to a stirred mixture consisting of 585 g. of hexamethylenetetramine and 1.5 liters of chloroform. The temperature of the resulting mixture rises rapidly and the reaction is moderated using an ice bath. After the initial exothermic reaction has subsided, the temperature of the reaction mixture is maintained at about 60° C. by external heating with a steam bath for a period of about four hours, stirring being continued throughout this period. The reaction mixture is then cooled. A solid product, which has separated, is collected, stirred briefly with one liter of absolute ethanol, filtered, washed successively with 400 ml. of absolute ethanol and 400 ml. of ether, and dried. The N-(3 - methyl - 2-thenoylmethyl)-hexamethylenetetraminium bromide so obtained has the formula

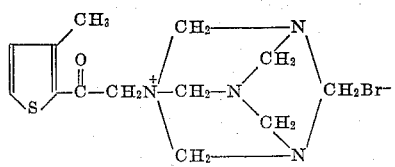

*Example 5*

Preparation of N - (2 - thenoylmethyl)-hexamethylenetetraminium chloride.

2-chloroacetylthiophene is prepared by the acetylation of thiophene using chloroacetyl chloride and aluminum chloride according to the method of Emerson and Patric (J. Org. Chem. 13, 722 (1948)).

A solution of 642 g. of 2-chloroacetylthiophene in one liter of chloroform is added as a single batch to a mixture consisting of 585 g. of hexamethylenetetramine and 1.5 liters of chloroform with a vigorous stirring. The temperature of the resulting mixture rises rapidly and cooling is sometimes required. After the initial exothermic reaction has moderated, the reaction mixture is maintained at a temperature of about 60° C. for a period of about four hours with continued stirring. The reaction mixture is then cooled and the solid product which has separated is collected, stirred briefly with one liter of absolute alcohol, filtered, washed with 400 ml. of absolute alcohol and then with 400 ml. of ether, and finally air-dried.

The crude N - (2 - thenoylmethyl)hexamethylenetetraminium chloride may be purified by treating an aqueous solution of same with decolorizing charcoal, filtering, and adding dioxane until a crystalline precipitate is formed. The purified compound has the formula

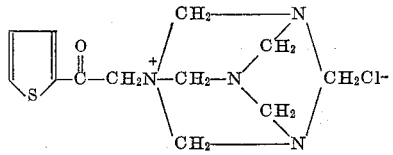

I claim:

1. A compound of the formula,

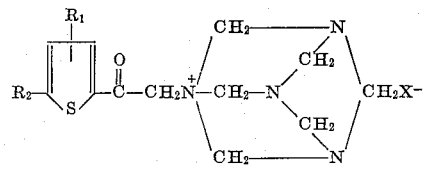

where R₁ is a member of the class consisting of hydrogen and lower alkyl radicals, R₂ is a member of the class consisting of hydrogen, halogen, nitro, and lower alkyl radicals, and X is selected from the group consisting of chlorine and bromine.

2. N - (2 - thenoylmethyl)hexamethylenetetraminium bromide.

3. A process which comprises reacting a compound of formula,

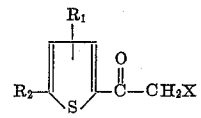

where R₁ is a member of the class consisting of hydrogen and lower alkyl radicals, R₂ is a member of the class consisting of hydrogen, halogen, nitro, and lower alkyl radicals, and X is selected from the group consisting of chlorine and bromine, with hexamethylenetetramine to obtain a compound of the formula,

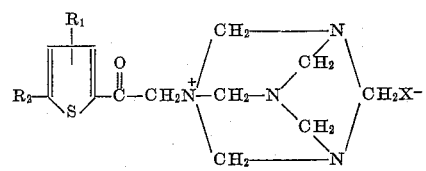

where R₁, R₂ and X have the same significance as above.

4. A process which comprises reacting 2-bromoacetylthiophene with hexamethylenetetramine in chloroform solution to obtain N-(2-thenoylmethyl)hexamethylenetetraminium bromide.

EDWARD C. HERMANN.

REFERENCES CITED

The following references are of record in the file of this patent:

UNITED STATES PATENTS

| Number | Name | Date |
| --- | --- | --- |
| 2,471,090 | Campaigne et al. | May 24, 1949 |